US009864871B2

(12) United States Patent
Farkash et al.

(10) Patent No.: US 9,864,871 B2
(45) Date of Patent: Jan. 9, 2018

(54) MASKING OF HAPTIC DATA (71) Applicant: International Business Machines Corporation, Armonk, NY (US)

(72) Inventors: Ariel Farkash, Shimshit (IL); Mattias Marder, Haifa (IL); Micha Moffie, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/604,685

(22) Filed: Jan. 24, 2015

(65) Prior Publication Data

US 2016/0217293 A1 Jul. 28, 2016

(51) Int. Cl.
H04L 29/06 (2006.01)
G06F 21/62 (2013.01)
G06F 3/01 (2006.01)
G09B 21/00 (2006.01)

(52) U.S. Cl.
CPC .......... *G06F 21/6209* (2013.01); *G06F 3/016* (2013.01); *G09B 21/003* (2013.01); *H04L 63/20* (2013.01)

(58) Field of Classification Search
CPC ......... H04L 29/06986; H04L 29/06578; H04L 63/20; G06F 21/10; G06F 21/6209; G06F 3/016
USPC ........................................................ 726/1-3
See application file for complete search history.

(56) References Cited

U.S. PATENT DOCUMENTS

| 8,570,161 | B2 | 10/2013 | Ramsay et al. | |
|---|---|---|---|---|
| 2008/0245855 | A1* | 10/2008 | Fein ........................ | G06Q 20/04 235/380 |
| 2010/0232654 | A1* | 9/2010 | Rahmes ............... | G06K 9/6289 382/117 |
| 2011/0050703 | A1* | 3/2011 | Artan ..................... | G06T 7/0081 345/440 |
| 2012/0299853 | A1 | 11/2012 | Dagar | |
| 2013/0249809 | A1 | 9/2013 | Kawalkar et al. | |
| 2014/0068706 | A1* | 3/2014 | Aissi ................... | G06F 21/6254 726/1 |
| 2014/0365281 | A1* | 12/2014 | Onischuk ............... | G07C 13/00 705/12 |

FOREIGN PATENT DOCUMENTS

KR 2020120007382 10/2012
WO 2010062901 6/2010
(Continued)

OTHER PUBLICATIONS

Perceptual and Bitrate-Scalable Coding of Haptic Surface Texture Signals, Chaudhari et al, 10.1109/JSTSP.2014.2374574, IEEE, 2015.*

(Continued)

*Primary Examiner* — Jahangir Kabir (57) ABSTRACT

A method comprising using at least one hardware processor for: obtaining haptic data comprising multiple data channels representing multiple characteristics of the haptic data; analyzing the haptic data to identify sensitive portions of the haptic data to which haptic masking rules apply; and masking the haptic data by applying the haptic masking rules to the sensitive portions of the haptic data in one or more data channels of the multiple data channels.

14 Claims, 6 Drawing Sheets (56) References Cited

FOREIGN PATENT DOCUMENTS

WO   2013041152   3/2013
WO   2013160561   10/2013

OTHER PUBLICATIONS

Disclosed Anonymously.,"Privacy Protection for Electronic Document Viewing", An IP.com Prior Art Database Technical Disclosure, Feb. 16, 2012.
Xuân Linh Labbé., "Touchscreen Accessibility—Accessible and Secure Authentication Using a Haptic Pin", University of Glasgow, Sep. 2010.
Disclosed Anonymously., "User Calibration of Haptics Technology", An IP.com Prior Art Database Technical Disclosure, Mar. 2, 2012.
Eko Armunanto., "Gadget breakthrough: Braille smartphone for the blind", Digital Journal, May 1, 2013, Can be found at: http://www.digitaljournal.com/article/349227.
Julian Horsey., "DrawBraille Ultimate Braille Smartphone Concept", Geeky gadgets, Feb. 21, 2012, Can be found at: http://www.geeky-gadgets.com/drawbraille-ultimate-braille-smartphone-concept-21-02-2012/.
Mike Sinclair .,"TouchMover: actuated 3D touchscreen with haptic feedback", ITS '13 Proceedings of the 2013 ACM international conference on Interactive tabletops and surfaces, pp. 287-296.

\* cited by examiner

- Masking rule for Tel number
  — Braille Regexp:

( *{3} *{3} *{4})

— Explanation
  - Regexp: (Num*{3}-Num*{3}-Num*{4})

MASKING OF HAPTIC DATA

BACKGROUND

The present invention relates to the field of data masking.

Data may be conveyed visually (e.g., by using a visual display), audibly or haptically (e.g., by using a haptic display). For example, a common method for conveying information to the blind is by the use of Braille, which is a haptic writing system. There are many scenarios where certain parts of the content of the data are private. Accordingly, there are existing solutions, such as masking, for enforcing privacy regulations on conveyed data.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: obtaining haptic data comprising multiple data channels representing multiple characteristics of the haptic data; analyzing the haptic data to identify sensitive portions of the haptic data to which haptic masking rules apply; and masking the haptic data by applying the haptic masking rules to the sensitive portions of the haptic data in one or more data channels of the multiple data channels.

There is provided, in accordance with another embodiment, a computer program product for masking haptic data according to masking rules defined based on a privacy policy to be enforced on the haptic data, the computer program product comprising a non-transitory computer-readable storage medium having program code embodied therewith, the program code executable by at least one hardware processor to: obtain haptic data comprising multiple data channels representing multiple characteristics of the haptic data; analyze the haptic data to identify sensitive portions of the haptic data to which the haptic masking rules apply; and mask the haptic data by applying the haptic masking rules to the sensitive portions of the haptic data in one or more data channels of the multiple data channels.

There is provided, in accordance with a further embodiment, a system comprising: a haptic display; and at least one hardware processor configured to: a) obtain haptic data comprising multiple data channels representing multiple characteristics of the haptic data, b) analyze the haptic data to identify sensitive portions of the haptic data to which haptic masking rules apply, c) mask the haptic data by applying the haptic masking rules to the sensitive portions of the haptic data in one or more data channels of the multiple data channels, and d) present the masked haptic data on the haptic display.

In some embodiments, the obtaining of the haptic data comprises retrieving the haptic data.

In some embodiments, the method further comprises using the at least one hardware processor for presenting the masked haptic data via a haptic display.

In some embodiments, the applying of the haptic masking rules to the one or more data channels comprises replacing the sensitive portions in at least one data channel of the one or more data channels with alternative data.

In some embodiments, the multiple data channels comprise a depth channel, the replacing of the sensitive portions comprises in-painting the sensitive portions in the depth channel by using an isotropic diffusion in-painting algorithm.

In some embodiments, the multiple data channels comprise a texture channel, the replacing of the sensitive portions comprises in-painting of the sensitive portions in the texture channel by using an Exemplar-Based image in-painting algorithm.

In some embodiments, the method further comprises receiving a privacy policy to be enforced on the haptic data; and defining the haptic masking rules based on the privacy policy.

In some embodiments, the program code is further executable by said at least one hardware processor to present the masked haptic data via a haptic display.

In some embodiments, the system further comprises a haptic sensor, wherein the obtaining of the haptic data by said at least one hardware processor comprises retrieving the haptic data by utilizing said haptic sensor.

In some embodiments, the haptic data may be selected from the group consisting of: Braille writing, clinical information, user interface (UI) elements and embossments.

In some embodiments, the multiple data channels may be selected from the group consisting of: a depth channel, a texture channel and an elasticity channel.

In some embodiments, the at least one hardware processor is further configured to: receive a privacy policy to be enforced on the haptic data; and define the haptic masking rules based on the privacy policy.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Masking of haptic data such as Braille writing, clinical information or user interface (UI) button is herein disclosed.

Haptic data may include sensitive and/or private information and therefore enforcing of a privacy policy may be desired. The disclosed methods, computer program products and systems may mask such data by processing the haptic data, to identify and mask sensitive portions of the haptic data according to a privacy policy. The enforcing of a privacy policy on haptic content may be performed by defining and/or applying rules on top of a digital form of the haptic content and prior to its presentation, e.g., by a haptic display. Existing algorithms from fields such as imaging analysis may be adjusted for identification and masking of haptic data.

The disclosed data masking may analyze the haptic information (e.g., parse Braille writing or process clinical haptic information) and may utilize common privacy identification and enforcement methodology for masking data. For example, one may use methodology such as regular expressions for masking haptic data representing textual content and/or modify algorithms used in image processing, such as in-painting algorithms, for masking haptic data representing haptic content having separate channels for the different parameters, e.g., depth, texture and elasticity. For example, one or more dimensions may be added to a two-dimensional image representing an area of interest, such as an area in a human's face. The one or more additional dimensions may represent one or more haptic characteristics of the image pixels, such as depth and texture, correspondingly.

The terms "data" and "information" may be used interchangeably throughout the application.

The term "haptic display" may refer to a display which displays haptic data such as depth, texture, and elasticity, other than visual data. Examples for such a haptic display are the actuated 3D display by Microsoft corporation: Microsoft. "Actuated 3D-Display with Haptic Feedback". Online video clip. Microsoft Research. Microsoft, 1 Jul. 2013. Web. 2 Oct. 2014. <http://research.microsoft.com/apps/video/defaultaspx?id=194835> or the feelscreen by Senseg ltd: Slush. "Next Gen Touch Screens, Feel the Touch—Senseg Demo" Online video clip. YouTube. YouTube, 21 Sep. 2012. Web. 20 Oct. 2014. <http://www.youtube.com/watch?v=loARSmw21rg>.

The term "haptic image" may relate to an image displayed by a haptic display and which may include haptic information.

Figure 1:
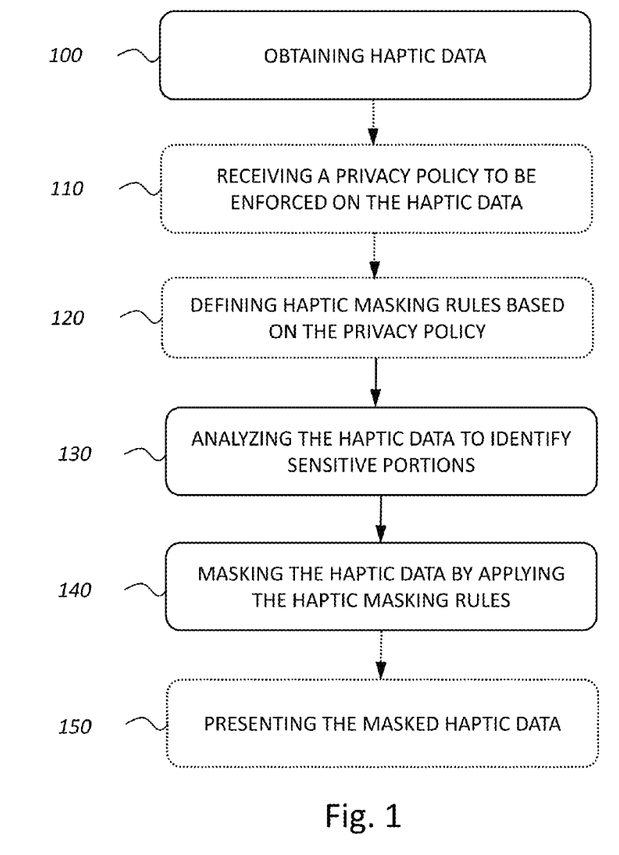
FIG. 1 shows a flowchart of a method for masking haptic data, constructed and operative in accordance with an embodiment of the disclosed techniques.

Reference is now made to FIG. 1, which shows a flowchart of a method for masking haptic data, constructed and operative in accordance with an embodiment of the disclosed techniques. In a step 100, haptic data may be obtained. The haptic data may include data having haptic characteristics such as skin features or data which may be additionally specified by haptic characteristics such as text presented in Braille writing. Thus, haptic data may be, for example, clinical information, such as skin features, which may be characterized by texture, depth and/or elasticity; Braille writing, which may be characterized by depth; UI elements such as a UI button, which may be characterized by depth and texture; and embossments such as a company logo, which may also be characterized by depth and texture. The haptic data may include multiple data channels representing multiple haptic characteristics of the haptic data such as a depth channel representing depth, a texture channel representing texture, and an elasticity channel representing elasticity. The haptic data may be obtained in a digital form, i.e., as digital data. Such digital haptic data may be captured by specialized scanner for scanning depth, texture, etc., and displayed using known haptic displays.

In some embodiments, the haptic data may be received by at least one hardware processor configured to execute the method of FIG. 1. The haptic data may be provided by, for example, a haptic sensor coupled with the hardware processor via a communication network such as a Local Area Network (LAN) or the internet. Optionally, the obtaining of the haptic data may include retrieving of the haptic data. The haptic data may be retrieved by scanning the data, e.g., by three-dimensional (3D) scanners such as Magnetic Resonance Imaging (MRI) and Computed Tomography (CT).

In an optional step 110, a privacy policy to be enforced on the haptic data may be received. The privacy policy may be provided by an owner and/or a person or entity in charge of or responsible for the haptic data and/or its transfer. The method of FIG. 1 or a portion of it may be applied by dedicated software. In some embodiments, the privacy policy may be then embedded in such dedicated software. Optionally, the dedicated software may include a user interface (e.g., a Graphical User Interface (GUI)) to allow a user to define the privacy policy within the frame of the dedicated software.

In an optional step 120, haptic masking rules may be defined based on the privacy policy. The haptic masking rules may be then assimilated in dedicated software. [Alternatively, in some embodiments, the haptic masking rules may be received, for example as input to dedicated software. Accordingly, in such embodiments, obtaining of the privacy policy is not required. In some embodiments, the haptic masking rules may be defined by dedicated software based on a user input with respect to the desired privacy policy, as detailed in step 110 above.

In a step 130, the haptic data may be analyzed to identify sensitive portions of the haptic data to which the haptic masking rules may apply. The haptic data may be analyzed automatically by dedicated software. For example, a model of desired data to be masked may be generated based on the masking rules. The haptic data may be then searched for instances of the model. The haptic masking rules may be received from a user and/or assimilated in the dedicated software or defined according to optional steps 110 and 120 above. The analysis and/or identification process may be performed with respect to one or more of the data channels of the haptic data in a separate and/or reciprocal manner. Alternatively or additionally, the sensitive portions may be analyzed and identified manually by a user (e.g., by an administrator or by the haptic data owner). In such embodiments the user may provide the sensitive portions as input to dedicated software. The automatic identification of the sensitive portions may be used as a suggestion to the user, which may, in turn, change these portions according to his discretion.

In a step 140, the haptic data may be masked by applying the haptic masking rules to the identified sensitive portions of the haptic data. For example, the haptic data may be masked by applying dedicated software assimilating these rules executed by at least one hardware processor. The masking of the haptic data may be performed by replacing the sensitive data in one or more of the data channels with alternative data. The masking of the haptic data may include utilizing known image processing algorithms such as in-painting methods. The algorithms may be adapted so that they may be applied to the haptic data. In some embodiments the masking of the haptic data may be performed by omitting data from the sensitive area portions in one or more of the data channels. For example, a telephone number in Braille writing may be omitted.

The masking rules and/or dedicated software assimilating these rules may be integrated in a proxy that is sniffing network traffic to identify and mask sensitive information in the network traffic and before the information reaches, for example, a haptic display.

It should be noted that when masking a haptic image or haptic information, preserving of the natural or expected haptic characteristics such as texture and elasticity of the masked region may be performed such that to eliminate traces of the masking itself. This is since in some cases, the mere observation of a masking operation may reveal at least some of the sensitive data. For example, when masking a mole in a haptic image of a person's face, if the masking operation is noticeable, the receiver of the haptic image may realize that this person has a unique skin feature at the masked spot. In addition, optimization of both material properties and surface properties may be performed.

Different known in-painting methods may be utilized for the different characteristics of the haptic data, in order to preserve the general characteristic of each domain (e.g., low frequency in depth data and high frequency in texture data). Thus, the applying of the haptic masking rules to the one or more data channels may include in-painting the sensitive portions in one or more data channels.

In some embodiments, the multiple data channels may include a depth channel, and the haptic masking rules may be applied to the depth channel. An in-painting of the sensitive portions in the depth channel may be performed, by using, for example, an isotropic diffusion in-painting algorithm. This is due to the assumption that the depth channel in the masked area has few and weak edges (i.e., the depth is typically homogeneous).

An exemplary pseudo code may include the following code lines, which provides a convolution mask that blurs the depth information that may be received by a two-dimensional signal:

while [Max delta in last iteration (pixel(i).delta)>Threshold];
convolve masked regions with kernel.
Thus, convolution may be performed in an iterative manner until reaching a predefined threshold. An exemplary configuration of an isotropic kernel may be:

| A | B | A |
| B | 0 | B |
| A | B | A | while A=0.073235 and B=0.176765, such that the matrix values sum to one. Alternative methods may be used for in-painting of sensitive portions in a depth channel. Inpainting methods which may be used are described, for example in: Manuel M. Oliveira et al. "Fast Digital Image Inpainting" *Proceedings of the International Conference on Visualization, Imaging and Image Processing*. VIIP. (2001); Tony F. Chan et al. "Mathematical Models for Local Nontexture Inpaintings" *SIAM J. Appl. Math*. Vol. 62, No. 3, pp. 1019-1043.

In some embodiments, the multiple data channels may include a texture channel, and the haptic masking rules may be applied to the texture channel. In-painting of the sensitive portions in the texture channel may be performed, by using, for example, an Exemplar-Based image in-painting algorithm (Criminisi A. "Region Filling and Object Removal by Exemplar-Based Image Inpainting" *IEEE Transactions on Image Processing* Vol. 13, No. 9, September 2004). Thus, one may strive to retain (rebuild) the structure and texture of the surrounding unmasked image portions simultaneously. One may then aim to replace the texture of sensitive data portions with texture similar to the surrounding neighborhood texture and preserve continuity of surrounding structural information (e.g. scratch or a scar in a haptic image of a person).

An exemplary pseudo code may include the following code lines, which provides an exemplary method for replacing texture patches of the masked area with texture patches taken from the non-masked area:

Extract the manually selected initial front $\delta\Omega^o$;
while fill front $\delta\Omega^t$ is not empty;
compute priorities $P(p)$ $\forall p \in \delta\Omega^t$;
find the patch $\Psi p\hat{}$ with the maximum priority;
find the exemplar $\Psi q\hat{} \in \Phi$ that minimizes $d(\Psi p\hat{}, \Psi q\hat{})$;
copy data from $\Psi q\hat{}$ to $\Psi p\hat{} \forall p \in \Psi p\hat{} \cap \Omega$;
update Confidence Values $C(p)$ $\forall p \in \Psi p\hat{} \cap \Omega$.

where $\Omega$ is the masked area and $\delta\Omega$ is the border of the masked area; P is a method to determine priority, p is a pixel in the data and $\Psi p\hat{}$ is a patch (i.e., a small region) around pixel p; and C a method for calculating confidence, while non-masked regions may have maximum confidence, masked pixels may have zero confidence and in-painted (altered) pixels may have confidence values somewhere in between.

The "priorities" may be determined by the average confidence of the surrounding pixels of a patch and the amount and direction of texture within the patch. Thus mask regions that continue an edge to be masked are painted first, and mask regions adjacent to the original image (i.e., on the initial border of the mask), and thereafter previously in-painted regions next. The priorities are updated at each iteration. The "exemplar" is a neighbor patch (i.e., a similar patch) from training data that fits well at the spot of the mask (i.e., the currently observed mask pixel). "Well" in this sense, means high correlation with surrounding pixels.

Figure 2:
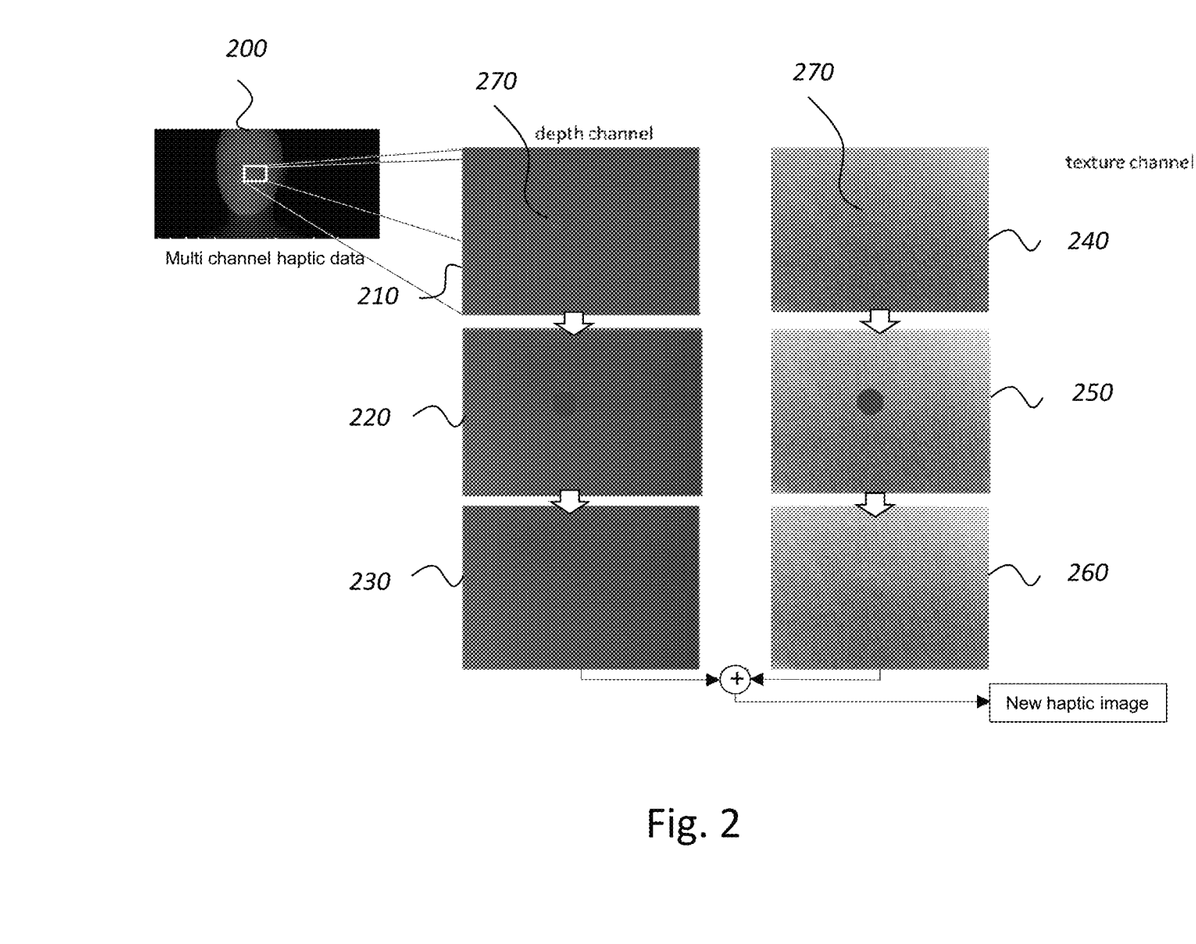
FIG. 2 shows images presenting the process of masking a depth channel and a texture channel of multi-channel haptic data of a mole.

Reference is now made to FIG. 2, which shows images presenting the process of masking a depth channel and a texture channel of multi-channel haptic data of a mole.

An image 200 is a multi-channel image of a mole 270. Image 200 presents a multi-channel haptic data of mole 270. A portion of image 200 which includes mole 270 is framed. Image 210 presents the depth channel (i.e., depth data) of the framed portion of image 200 and image 240 presents the texture channel (i.e., texture data) of the framed portion of image 200. The haptic content of image 200 may be masked separately in each channel. Images 210, 220 and 230 show the masking process for the depth channel and images 240, 250 and 260 show the masking process for the texture channel. Images 220 and 250 present the identification of the sensitive area to be masked, indicated by a darker circle which covers mole 270. Images 230 and 260 present the resulting masked channels, according to which the depth and texture of the sensitive area (i.e., the area of mole 270) is similar to the surrounding neighborhood.

An elasticity channel may be masked by using the techniques described above with respect to the masking of the depth and texture channels, with the required modifications.

In some embodiments, the haptic data may be masked by replacing the sensitive data portions with predefined profiles. A repository of profiles may be created and a profile may be then selected, for example, the profile which includes similar characteristics to the characteristics of the sensitive data portions or of their neighboring areas.

In an optional step 150, the masked haptic data may be presented, for example, on a haptic display.

A system for masking haptic data according to the method of FIG. 1 is further disclosed. The system may include a haptic display and at least one hardware processor configured to execute the method of FIG. 1 and, to this end, be in communication with the haptic display and provide haptic data thereto. The haptic display may be then used to present the haptic data (i.e., a haptic image) as masked by the at least one hardware processor. In some embodiments, the system may include a haptic sensor which may be used to retrieve the haptic data to be masked and provide it to the at least one hardware processor for masking. Such system may or may include the haptic display.

Figure 3:
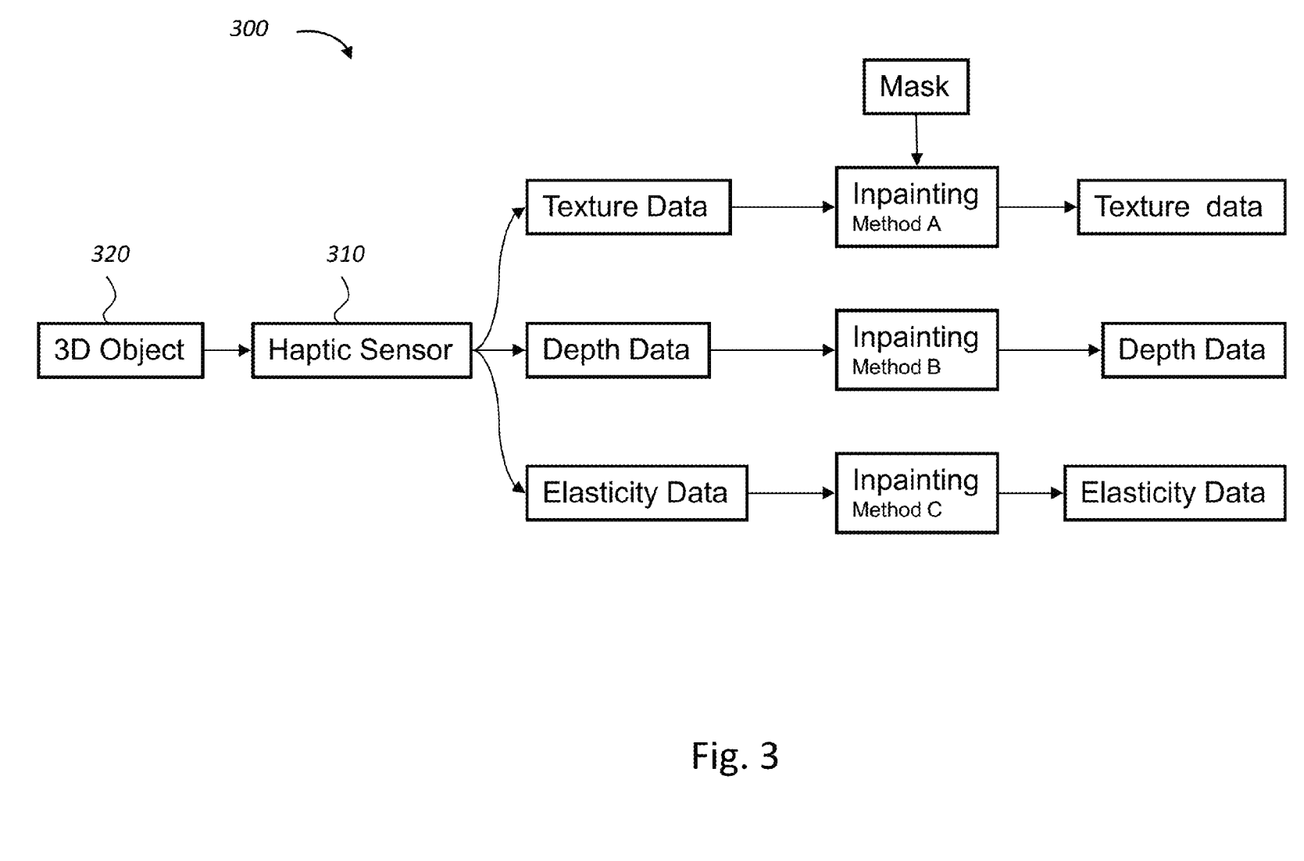
FIG. 3 shows a block diagram presenting the operation of an exemplary method for masking haptic data including three data channels in accordance with another embodiment of the disclosed technique.

Reference is now made to FIG. 3, which shows a block diagram presenting the operation of an exemplary haptic masking system 300 according to an embodiment of the disclosed technique. Haptic masking system 300 may include a haptic sensor 310, one or more processing units and one or more storage devices (not shown). Haptic sensor 300 and the one or more storage devices may be coupled with one or more of the processing units. Haptic sensor 300 may be used to scan different types of haptic data (i.e., having different haptic characteristics). Optionally, haptic masking system 300 may include a plurality of haptic sensors, which may be used to scan different types of haptic data. A three-dimensional object (3D) 320, which may be characterized by depth, for example, may be scanned by haptic sensor 310. The received data may be divided to three different channels of data corresponding to three characteristics of 3D object 320: texture data, depth data and elasticity data. Sensitive portions of data may be then identified in the data received by each channel. The sensitive portions of data may be then masked, for example, by utilizing in-painting methods. Different in-painting methods may be used for the different characteristics as shown in FIG. 2. The in-painting methods may be utilized to remove such sensitive data and fill the blanks with data similar to the surrounding of the sensitive data (i.e., replace the sensitive data) Following the above, each channel may output a masked data relating to the corresponding characteristic. The various portions of data relating to the different characteristics may be then rejoined to produce a masked version of the received haptic data. Haptic masking system 300 may further include a haptic display (not shown). The haptic display may be used to present the outputted masked haptic data.

Operations such as identifying of the sensitive data portions and masking them may be performed by one or more dedicated computer programs. For example, a separate computer program may be generated for each data type. Such computer programs may be installed on a haptic masking system such as haptic masking system 300, and may be executed by the one or more hardware processing units.

In the following table, six examples for haptic data that may require masking are presented. The examples are further detailed herein below.

| Example | Domain | Exemplary Haptic Characteristic | Privacy concern |
|---|---|---|---|
| Prosthetic eye | Healthcare | Firmness | QI, Sensitive |
| Facial mole | Healthcare | Contour | QI |
| Birth mark | Healthcare | Texture | QI |
| Braille | Generic - Information exchange | Contour | PII, QI, Sensitive |
| UI Button | On screen | Contour, | QI, Sensitive |
| Company Logo | Generic - Information exchange masking | Texture Contour | QI |

By indicating data as sensitive, it is meant that the identity of the person is known, but the data includes information that should not be shared (e.g. income, disease); by PII, it is meant Personal Identifying Information; and by QI it is meant Quasi identifier, i.e., data which may lead to identification of a person when joined with other information sources. The term "contour" may refer to depth edges, i.e., edges of an object characterized by depth.

Figure 4A:
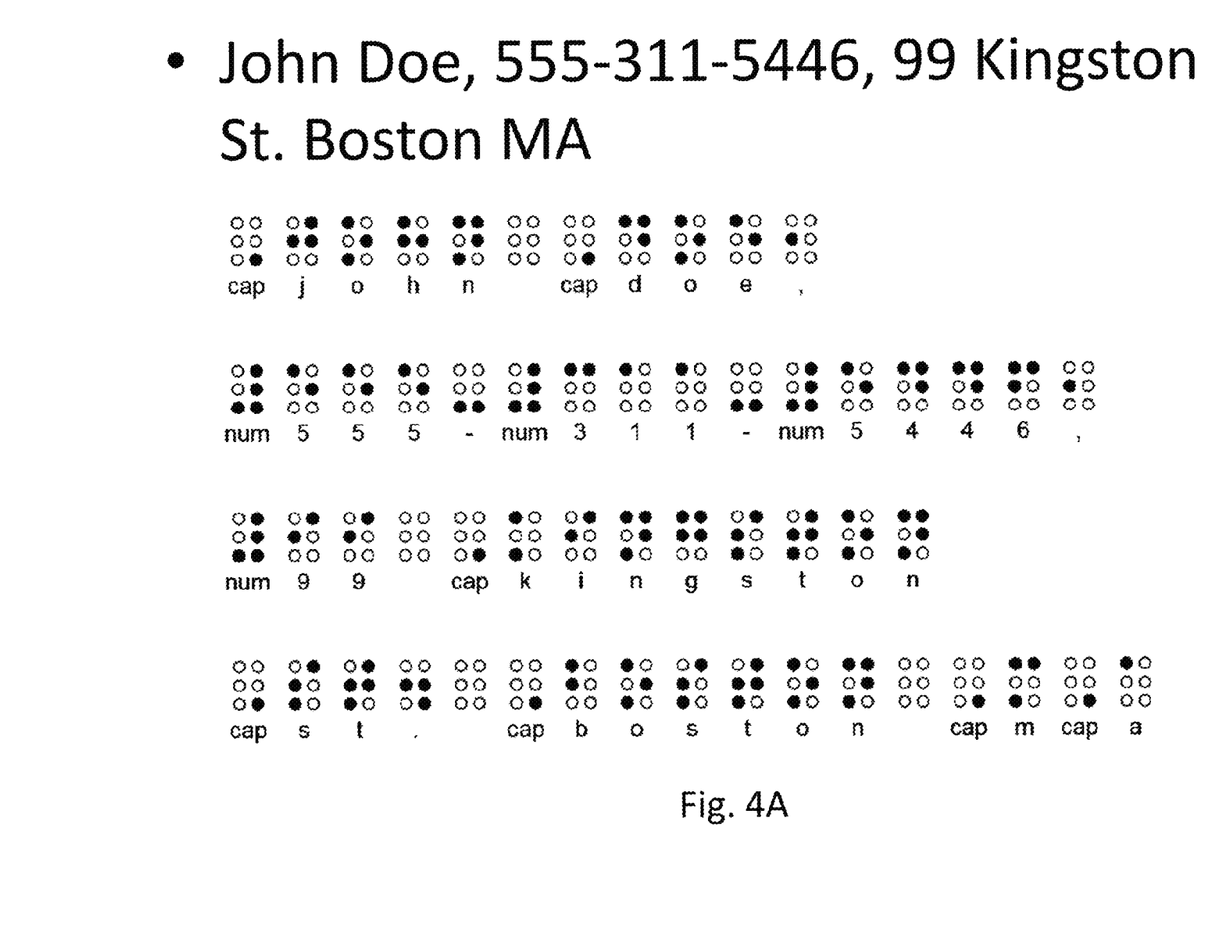
FIG. 4A shows an image of an exemplary data including an address in Braille writing and it's translation to regular text.
Figure 4B:
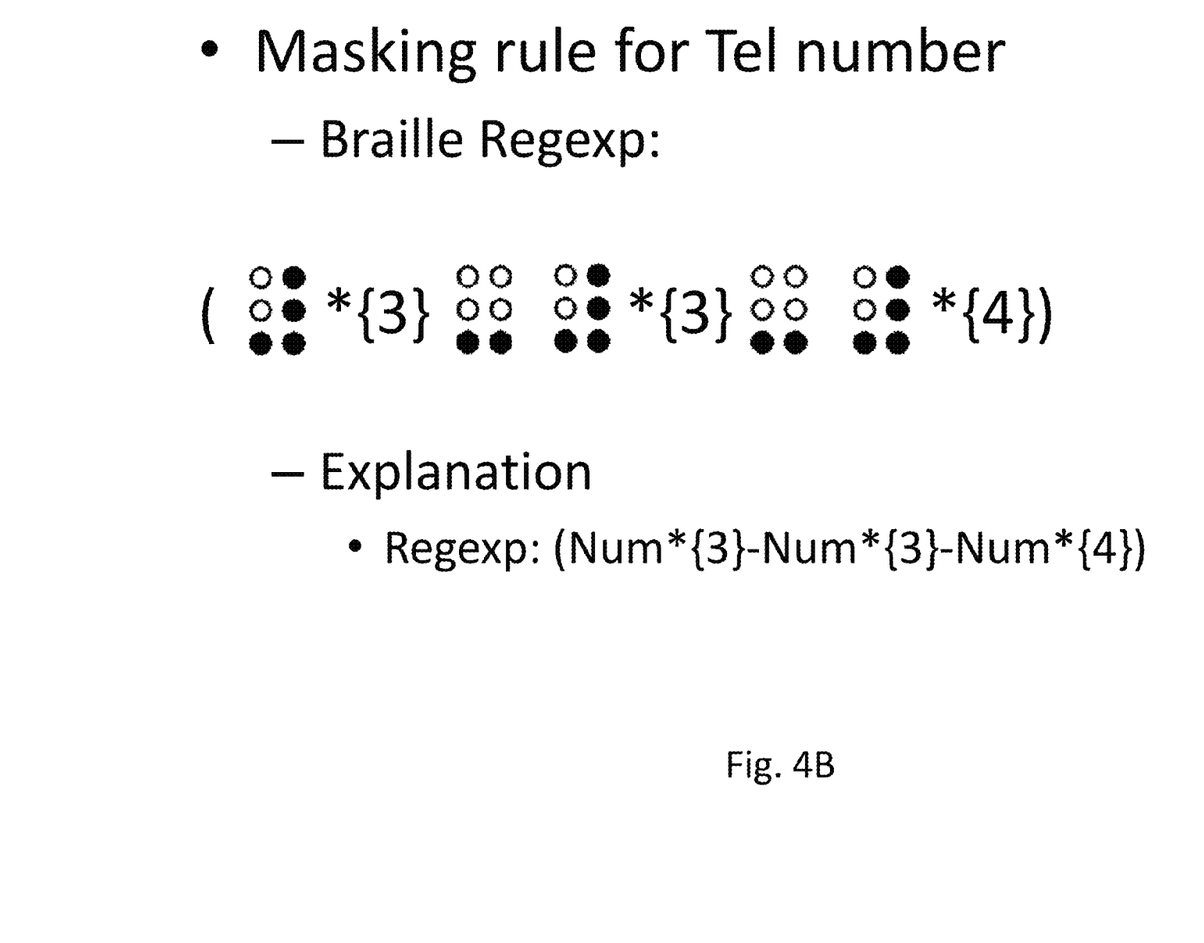
FIG. 4B shows a masking rule for the data of FIG. 4A including a regular expression in Braille writing aimed at masking the telephone number in the data according to the disclosed techniques.
Figure 4C:
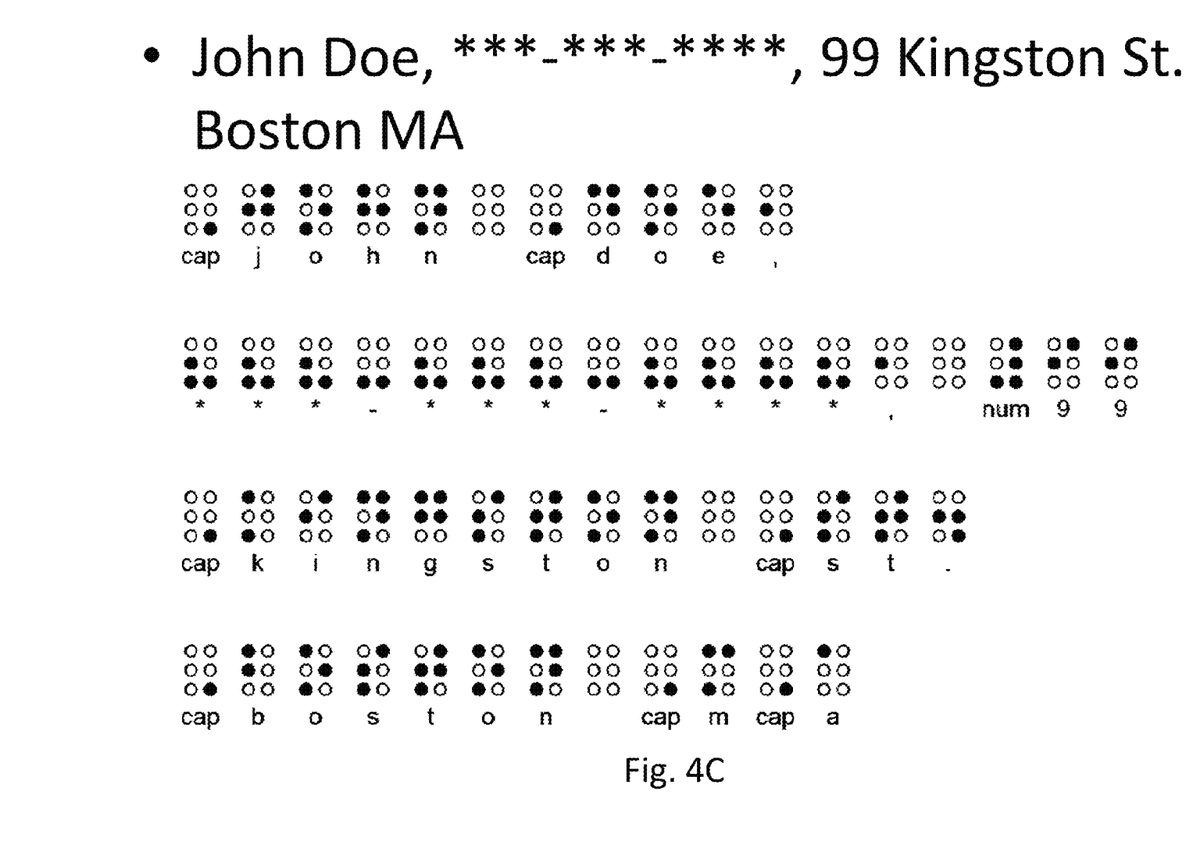
FIG. 4C shows the data of FIG. 4A after applying the masking rule of FIG. 3B.

In some embodiments, the haptic data may include Braille writing. Reference is now made to FIGS. 4A, 4B and 4C. FIG. 4A shows an image of an exemplary data including an address in Braille writing and it's translation to regular text. FIG. 4B shows a masking rule for the data of FIG. 4A including a regular expression in Braille writing aimed at masking the telephone number in the data according to the disclosed techniques. FIG. 4C shows the data of FIG. 4A after applying the masking rule of FIG. 4B.

A telephone number is an example to sensitive information that may be part of any personal record. FIG. 4A shows an image of the exemplary data, i.e., an address, in Braille annotated with corresponding explanations. FIG. 4B shows Braille based masking rule for masking the telephone number included in the address?]. A regular expression in Braille writing for a telephone number may be defined. The regular expression may have the following pattern: three numbers, a hyphen, three numbers, a hyphen and then four numbers. The Braille writing address in FIG. 4A may be then analyzed (i.e., searched) to identify patterns corresponding to the regular expression (i.e., sensitive portions). FIG. 4C shows the Braille based masked content. In the masked data, each number in the defined pattern is replaced by an asterisk. The defined pattern may be replaced by any other sign, string, number (e.g., "0") etc. In some embodiments, the defined pattern may be omitted (i.e., without replacing it).

Braille writing masking may be built upon existing technology and utilize common privacy enforcement methodology. Masking of Braille content may be performed by utilizing a component for describing and enforcing rules on top of a touch display.

In some embodiments, the haptic data may include clinical information such as skin features, e.g., facial mole or a birthmark, or other clinical information such as prosthetic eye. Such facial features may be QI information which may not be required by the physician for proper diagnosis. For example, haptic information of a face of a person may be transferred to a remote physician, e.g., by using a haptic display, for diagnosis of a condition, e.g., a type of fungus or rash, on, e.g., the cheek, forehead and nose.

A facial mole (hereinafter "the mole") detection may be manual or automatic For example, the mole may be modeled as a sphere of a size smaller than one centimeter with hardened force responses with respect to the immediate surrounding skin area. Next, maximally stable external regions (MSER) may be used to detect spherical shaped regions of a specified size and therefore identify moles.

The mole may be masked, for example, by performing in-painting as describe with respect to FIG. 2. In some embodiments, the mole may be masked by using L1 inpainting (i.e., sum of absolute values of the patches) and Orthogonal Matching Pursuit (OMP) on marked regions areas to obtain the simplest combination of patches to mask the marked regions areas.

In some embodiments, the clinical information may include a prosthetic eye. Combining a zip code of an individual, for example, and the fact that he has a glass eye may very well suffice to identify the individual, thus having a glass eye is a quasi-identifier. The physician may not require the information of the glass eye to make the desired diagnosis and therefore this piece of private information may remain undisclosed. Such information may not be detected in an image (if given) but may easily be detected in a haptic image presented by a haptic display, for example, by pressing on the eye in a haptic display. An implementation of masking of a prosthetic eye may be to match its haptic characteristics (e.g. compression etc.) to the natural eye.

In some embodiments, the haptic data may include a haptically interactive element such as user interface (UI) elements (e.g., a UI button on a haptic display). For example, a UI Button may reveal sensitive information. Thus, masking of the UI button may be desired by applying on-screen masking of haptic information. Haptic information of a UI button may be, for example, depth and/or texture. In addition, visual information of a UI button, such as color, may be masked as well. Such haptic and visual information may be masked, for example, by replacing it with information similar to its surroundings as exemplified above.

For example, one may aim to mask haptic content on a customer relationship management (CRM) application screen where sensitive data of information may be displayed. The screen may present a table containing personal identifier in one column and another column in which a button may be pressed to display additional information that is sensitive (e.g. past surgeries, past accidents, past insurance claims).

It should be noted that such a button may appear only when additional information exists. However, the mere existence of this button reveals some sensitive information on the individual, e.g., the existence of a mental illness. While the specific mental illness details may not be shown, the fact that the individual has any mental illness is sensitive information.

In some embodiments, the haptic data may include embossments such as a company logo. A company logo (e.g., Apple logo) may convey information related to a company or to a person (e.g., that the person is an employee of the company) and therefore it may be a PII or a QI. A logo may be characterized by haptic data such as depth. Thus, when a logo may be displayed on a haptic display, the disclosed haptic masking may be applied.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
   obtaining haptic data comprising multiple different data channels each selected from the group consisting of: a depth channel, a texture channel, and an elasticity channel, wherein the multiple data channels represent multiple different characteristics of the haptic data, wherein each of the multiple different characteristics is selected from the group consisting of: depth, texture, and elasticity, respectively to the multiple data channels;
   analyzing the haptic data to identify sensitive portions of the haptic data;
   determining, in response to the identification, a set of haptic masking rules based on a security policy;
   masking the haptic data by applying the determined haptic masking rules to the sensitive portions of the haptic data in one or more data channels of the multiple data channels by replacing the sensitive portions in at least one data channel of the one or more data channels with alternative data; and
   presenting the masked haptic data using a haptic display, wherein the haptic display Conveys the masked haptic data through at least one of depth, texture, and elasticity, that can be sensed by the sense of touch of a user.

2. The method according to claim 1, wherein: the replacing of the sensitive portions comprises in-painting of the sensitive portions in the depth channel by using an isotropic diffusion in-painting algorithm.

3. The method according to claim 1, wherein: the replacing of the sensitive portions comprises in-painting of the sensitive portions in the texture channel by using an Exemplar-Based image in-painting algorithm.

4. The method according to claim 1, further comprising: receiving a privacy policy to be enforced on the haptic data; and defining the haptic masking rules based on the privacy policy.

5. The method according to claim 1, wherein the applying of the haptic masking rules to the one or more data channels comprises omitting the sensitive portions from at least one data channel of the one or more data channels.

6. A computer program product for masking haptic data according to masking rules defined based on a privacy policy to be enforced on the haptic data, the computer program product comprising a non-transitory computer-readable storage medium having program code embodied therewith, the program code executable by at least one hardware processor to:
   obtain haptic data comprising multiple different data channels each selected from the group consisting of: a depth channel, a texture channel, and an elasticity channel, wherein the multi pie-data channels represent multiple characteristics of the haptic data, wherein each of the multiple different characteristics is selected from the group consisting of: depth, texture, and elasticity, respectively to fee multiple data channels;
   analyze the haptic data to identify sensitive portions of the haptic data;
   determining, in response to the identification, a set of haptic masking rules based on a security policy;
   mask the haptic data by applying the haptic masking rules to the sensitive portions of the haptic data in one or more data channels of the multiple data channels by replacing the sensitive portions in at least one data channel of the one or more data channels with alternative data; and
   present the masked haptic data using a haptic display, wherein the haptic display conveys the masked haptic data through at least one of depth, texture, and elasticity, that can be sensed by the sense of touch of a user.

7. The computer program product according to claim 6, wherein: the replacing of the sensitive portions comprises in-painting of the sensitive portions in the depth channel by using an isotropic diffusion in-painting algorithm.

8. The computer program product according to claim 6, wherein: the replacing of the sensitive portions comprises in-painting of the sensitive portions in the texture channel by using an Exemplar-Based image in-painting algorithm.

9. A system comprising:

a haptic display; and at least one hardware processor configured to:

a) obtain haptic data comprising multiple different data channels each selected from the group consisting of: a depth channel, a texture channel, and an elasticity channel, wherein the multiple data channels represent representing multiple characteristics of the haptic data, wherein each of the multiple different characteristics is selected from the group consisting of: depth, texture, and elasticity, respectively to the multiple data channels, b) analyze the haptic data to identify sensitive portions of the haptic data;

c) determine, in response to the identification, a set of haptic masking rules based on a security policy, d) mask the haptic data by applying the haptic masking rules to the sensitive portions of the haptic data in one or more data channels of the multiple data channels by replacing the sensitive portions in at least one data channel of the one or more data channels with alternative data, and e) present the masked haptic data on-using the haptic display, such that the haptic display conveys the masked haptic data through at least one of depth, texture, and elasticity, that can be sensed by the sense of touch of a user.

10. The system according to claim 9, further comprising a haptic sensor, wherein the obtaining of the haptic data by said at least one hardware processor comprises retrieving the haptic data by utilizing said haptic sensor.

11. The system according to claim 9, wherein the haptic data is selected from the group consisting of: Braille writing, clinical information, user interface (UI) element and embossments.

12. The system according to claim 9, wherein: the replacing of the sensitive portions comprises in-painting of the sensitive portions in the depth channel by using an isotropic diffusion in-painting algorithm.

13. The method according to claim 9, wherein: the replacing of the sensitive portions comprises in-painting of the sensitive portions in the texture channel by using an Exemplar-Based image in-painting algorithm.

14. The system according to claim 9, wherein the at least one hardware processor is further configured to:

receive a privacy policy to be enforced on the haptic data; and define the haptic masking rules based on the privacy policy.

\* \* \* \* \*